United States Patent [19]
Macedo et al.

[11] Patent Number: 5,405,590
[45] Date of Patent: Apr. 11, 1995

[54] OFF-GAS SCRUBBER SYSTEM

[75] Inventors: Pedro B. D. Macado, 6100 Highboro Drive, Bethesda, Md. 20817; Hamid Hojaji; Marek Brandys, both of Bethesda, Md.; Robert K. Mohr, Washington, D.C.

[73] Assignees: Pedro Buarque De Macedo, Bethesda; Theodore Aaron Litovitz, Annapolis, both of Md.

[21] Appl. No.: 15,022

[22] Filed: Feb. 5, 1993

[51] Int. Cl.[6] .............................................. B01D 53/34
[52] U.S. Cl. ................................ 423/210; 423/240 R; 423/252; 423/253; 423/243.08; 588/205; 55/220; 55/228; 55/229; 422/170; 422/189
[58] Field of Search ............... 423/210, 236, 253, 252, 423/240 R; 588/205, 238, 252, 11; 55/220, 228, 229; 422/170, 189

[56] References Cited

U.S. PATENT DOCUMENTS

| | | | |
|---|---|---|---|
| 2,351,167 | 6/1944 | Ware | 423/219 |
| 3,332,884 | 7/1967 | Kelmar | 252/301.1 |
| 3,414,248 | 12/1968 | Iwanaga et al. | 261/122 |
| 3,709,978 | 1/1973 | Predikant | 423/240 R |
| 3,803,804 | 4/1974 | Arashi et al. | 55/73 |
| 3,884,162 | 5/1975 | Schuster | 110/8 R |
| 3,953,578 | 4/1976 | Thirion | 423/242 |
| 4,019,444 | 4/1977 | Kleeberg et al. | 110/7 R |
| 4,102,982 | 7/1978 | Weir, Jr. | 423/242 |
| 4,615,833 | 10/1986 | Kaufmann | 252/629 |
| 4,678,493 | 7/1987 | Roberts et al. | 65/134 |
| 4,719,088 | 1/1988 | Itoh et al. | 422/106 |
| 4,799,941 | 1/1989 | Westermark | 55/90 |
| 4,915,712 | 4/1990 | Feldsted | 55/84 |
| 4,954,293 | 9/1990 | Cailly et al. | 252/625 |
| 4,999,167 | 3/1991 | Skelley et al. | 422/175 |
| 5,041,274 | 8/1991 | Kagi, Sr. | 423/242 |
| 5,052,312 | 10/1991 | Rackley et al. | 110/346 |
| 5,143,527 | 9/1992 | Tian-Song | 55/222 |

FOREIGN PATENT DOCUMENTS

| | | | |
|---|---|---|---|
| 2728176 | 1/1979 | Germany | 423/210 |
| 2739509 | 3/1979 | Germany | 423/210 |
| 4107927 | 9/1992 | Germany | 588/252 |
| 63-59337 | 3/1988 | Japan | 423/210 |

*Primary Examiner*—Gary P. Straub
*Assistant Examiner*—Timothy C. Vanoy
*Attorney, Agent, or Firm*—Jacobson, Price, Holman & Stern

[57] ABSTRACT

An off-gas quencher and solid recovery scrubber unit includes a wet flue gas scrubber which has the dual responsibilities of lowering the temperature of the inlet hot gas entering through the scrubber and trapping contaminants from the gas stream into the liquid stream. The hot exhaust gases are first cooled by evaporating the liquid scrubber solution. The contaminants of the exhaust gas are neutralized by a suitable reagent such as sodium hydroxide and the product is collected in the scrubbing solution. Since the solution is continuously recycled, the concentration of the scrubbing agent will be diminished as the scrubbing proceeds, while the concentration of the scrubbing product in the solution will rise to the solubility limit of the product. The scrubbing products start to precipitate and are collected at the bottom of the scrubber and are withdrawn. The scrubbing reagents are continuously replenished to the scrubber. The secondary scrubber is another wet scrubber which uses reagents/water from spray nozzles to scrub off any contaminants that might have escaped the solid recovery scrubber. In addition, the exhaust gas entering the secondary scrubber is cooled below its dew point which results in condensation of water in the scrubber.

27 Claims, 1 Drawing Sheet

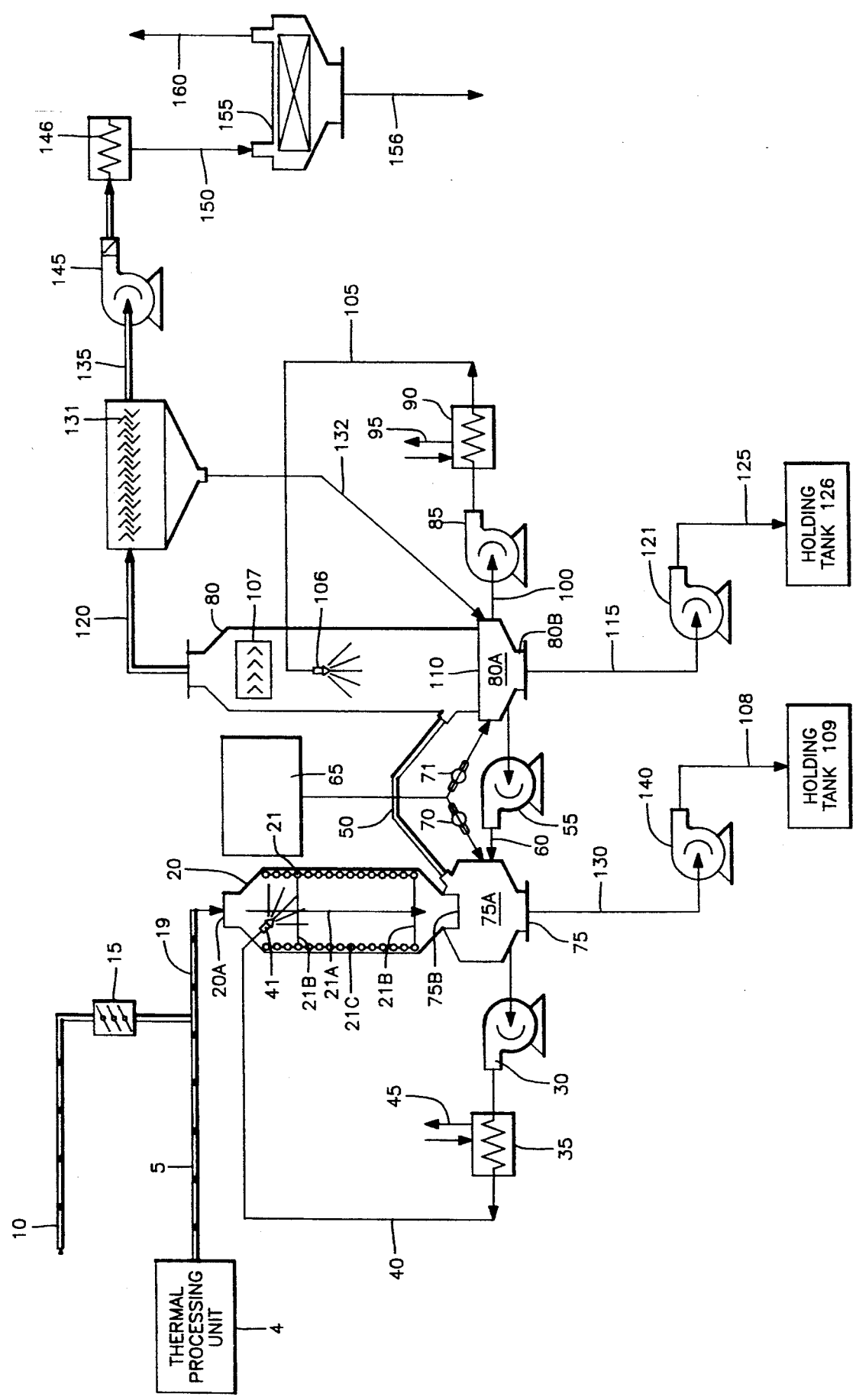

OFF-GAS SCRUBBER SYSTEM

FIELD OF THE INVENTION

This application relates to an off-gas scrubber system having at least two scrubbers connected in series.

BACKGROUND OF THE INVENTION

Thermal processes, as their name implies, include all the processes in which heat is the driving force. Such processes include but are not limited to:

| PROCESS | EXAMPLES |
| --- | --- |
| combustion | boilers, incinerators, furnaces |
| calcination | cement and ceramic calciners |
| fusion or melting | glass melters |
| sintering | ceramic kilns |
| evaporation | dryers |

In most thermal processes, gaseous by products are exhausted from the process via an off-gas system. Gaseous byproducts can be simply water vapor in the case of, for example, a laundry dryer which is exhausted directly to the ambient air without posing any danger to the environment. Or, the gaseous byproducts could contain one or multiple toxic gases such as HCl, HF, $UF_6$, $NO_x$, $SO_x$, CO, or toxic solid particulates, such as heavy metals, etc., which cannot be released to the environment without first being removed from the gaseous exhaust stream.

In U.S. Pat. No. 4,019,444 to Kleeberg et al., a method of using the heat of off-gas to evaporate scrubber solution resulting in dry waste is disclosed. The process uses an evaporator where slurry from a scrubber, after neutralization, is dried to complete dryness. The dried sludge particles are picked up in an electrostatic precipitator. The off-gas is then passed through a scrubber. The scrubber solution is allowed to settle in a clarifier. The supernatant is reused in the scrubber while the sludge is fed to a neutralizer. The disadvantage of the disclosure of Kleeberg is that the neutralizer increases the amount of solids contained in the system and the electrostatic precipitator is expensive. The powders accumulated in the precipitator are of low density and produce large volumes of waste.

Other patents relating to scrubber systems are U.S. Pat. No. 3,414,248 to Iwanaga et al., U.S. Pat. No. 3,332,884 to J. J. Kelmar, U.S. Pat. No. 3,803,804 to Arashi, et al., and U.S. Pat. No. 4,799,941 to Westermark.

In the patent to Kelmar a method of fixing radioactive fission product waste is disclosed. The system includes spraying a waste solution onto a burden of coal waste and combustible materials in a slagging furnace, and spraying scrubber solution onto the burden of coal. A problem is encountered in evaporating large quantities of water which require high energy for processing.

SUMMARY OF THE INVENTION

Thermal processing in a preferred mode of the present invention includes an electric glass melter. However, other thermal processes can take advantage of the present invention. In the glass melter, hazardous materials, such as asbestos, medical waste, and radioactive waste, are vitrified.

The feed to the glass melter is comprised of at least a portion of a toxic waste either in the form of a solid, a liquid, a sludge or combination thereof. In one particular example, the waste form is a radioactive sludge which contains large amounts of magnesium fluoride in addition to uranium and thorium ions. In another example, the waste can be varieties of solid medical waste forms which among other toxic elements can contain many of the transition metals and during incineration can produce also $NO_x$, and HCl gases.

The feed to the glass melter generally contains other additives to produce a stable glassy product which can safely be disposed of. In the case of a glass melter, feed is usually introduced to the melter in the form of a slurry. The solid portion of the slurry is melted into glass, and gaseous byproducts together with some solid particulate and steam will leave the melter via an off-gas conduit. To cool the exhaust gases without introducing heat exchangers, dilution air is introduced via a conduit having an air flow controller (or damper). The temperature of the exhaust gases entering an off-gas scrubber can be adjusted by the volume of dilution air being introduced into the off-gas by the air flow controller.

In the case of an incinerator or a boiler, heat can be recovered from the hot off-gas through one or a plurality of heat exchangers to preheat combustion air or water, respectively.

An off-gas quencher and solid recovery scrubber unit includes a wet flue gas scrubber which has the dual responsibilities of lowering the temperature of the inlet hot gas entering through the scrubber and at the same time trapping contaminants from the gas stream into the liquid stream. The hot exhaust gases are first cooled when they supply the latent heat of evaporation to the liquid scrubber solution. The contaminants of the exhaust gas are neutralized by a suitable reagent such as sodium hydroxide in the case of acidic contaminants and the product is collected in the scrubbing solution. Since the solution is continuously recycled, the concentration of the scrubbing reagent will be diminished as the scrubbing proceeds. On the other hand, the concentration of the scrubbing product in the solution will rise, and eventually will exceed the solubility limit of the product.

At the saturation limit, the scrubbing products start to precipitate and are collected at the bottom of the scrubber. In order to have sufficient quantities of the scrubbing reagents, the scrubbing reagents are continuously replenished to the scrubber. The precipitates at the bottom can either continuously or intermittently be removed from the scrubber.

The secondary scrubber is another wet scrubber which uses reagents/water from spray nozzles to scrub off the tailing of any contaminants that might have escaped the solid recovery scrubber. In addition, the exhaust gas entering the secondary scrubber is cooled below its dew point which results in condensation of water in the scrubber. The scrubber solution temperature is adjusted by a heat exchanger which is regulated by a level control.

It is one object of the present invention to keep the volume of scrubber solution fixed so there will not be any secondary waste solution generated during scrubbing. Based on this requirement, if the volume of the scrubbing solution starts to increase because of a high rate of condensation of the incoming exhaust gases, then less heat is removed from the scrubber solution to allow for more evaporation from the secondary scrubber. In contrast, if the volume of the scrubber solution starts to decrease, more heat is removed from the scrubber solution to allow for higher condensation of incoming exhaust into the secondary scrubber.

It is also another object of this invention to supply water/reagents solution from the secondary scrubber to the solid recovery scrubber. Again the goal is to keep the total volume of scrubbing solutions fixed no matter how many scrubbers are being used.

According to the present invention, if the volume of reagents/water in the solid recovery scrubber starts to fall due to an excessive evaporation rate, the reagents/water will be replenished by bringing in solution from the secondary scrubber. Subsequently, the condensation rate will be increased by lowering the temperature of the secondary scrubber solution to compensate for the transferred volume to the solid recovery scrubber.

Still another object of this invention is to use a flow of reagent from a higher side in the secondary scrubber to a lower side in the solid recovery scrubber to replenish rapidly, depleted reagents in the solid scrubber. As it is clear by now, acid gases and other contaminants are neutralized and trapped in the solid scrubber at a much faster rate than the secondary scrubber, thus consuming reagents at much faster rates. If the two scrubbers are situated in such a way that their solution levels are the same, then the reagents will diffuse naturally through an open line from the secondary scrubber to the solid recovery scrubber. This condition applies if the reagent concentration is initially higher in the secondary scrubber or at least the same. Thus, reagents can be only added to the secondary scrubber which then flow to the solid scrubber if the two scrubbers are communicating through an open line. However, for extra protection against line clogging and to allow for the concentration of the reagents in the primary scrubber to be higher than in the secondary scrubber (if necessary from scrubbing efficiency considerations), a pump can be used to transfer the solution between the two scrubbers.

These and other objects of the invention, as well as many of the intended advantages thereof, will become more readily apparent when reference is made to the following description taken in conjunction with the accompanying drawings.

BRIEF DESCRIPTION OF THE DRAWINGS

The drawing schematically illustrates an off-gas scrubber system.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Hot off-gases are delivered from a thermal processing unit 4 by an off-gas conduit 5. Dilution air is introduced by conduit 10 to an air flow controller 15. The temperature of the off-gas in conduit 10 is controlled by adjustment of air volume passing through air flow controller 15 so as to control air temperature in conduit 19 going to scrubber 20.

The off-gas entering scrubber 20 at inlet 20A encounters a high velocity, high pressure water/reagent spray jet 41 which cools the off-gas and causes the contaminants in the off-gas to be deposited either on the walls of scrubber 20 or be deposited in a turbulent water/reagent bath at the bottom of the scrubber in bottom chamber 75. The water jet nozzle 41 in the figure schematically represents more than one nozzle, preferably 2-4 nozzles circumferentially spaced apart by 180 or 90 degrees, respectively.

The purified off-gas then travels up through conduit 50 into the second stage scrubbing unit 80. The scrubbing solution 75A in chamber 75 is then pumped back to the spray nozzle 41 through pump 30, heat exchanger 35 and return conduit 40. Pump 30 should be of type that not only can pump liquids with large volumes of suspended solids (up to about 50%) but it should also be resistive to corrosion due to a high alkali concentration (for example 2-3 molar sodium hydroxide). Progressive cavity pumps or diaphragm air pumps with non-corrosive contact parts are suitable candidates. Optionally, if desired, heat exchanger 35 can remove heat from the returned scrubber solution 75A to lower the amount of evaporation in scrubber 20.

Therefore, to control the temperature of the off-gas exhaust gases leaving the scrubber 20 from outlet 50, one can either control the volume of dilution air entering conduit 19 by air flow controller 15, or alternatively, control the amount of heat being removed from the return scrubber solution by heat exchanger 35, or both. Consequently, the temperature of the off-gas exhaust gases from scrubber 20 can be controlled very accurately.

During normal operations, especially when acid gases are being scrubbed, the reaction of the scrubbing reagents with acid contaminants occurs above the spray nozzles 41 where a misty curtain of the solution is normally formed. As a result, the scrubbing products tend to deposit onto the walls of the scrubber 20 above and below nozzles 41 which may eventually clog the upper part of the scrubber 20.

To alleviate this problem, a mechanical scrapping mechanism 21 is built into the scrubber 20. The scrapping mechanisms of the present invention includes a central shaft 21A which is connected to a variable speed motor located outside, on the upper side of the scrubber 20. To the shaft are welded rows of horizontal braces 21B at the ends of which are connected vertical chains 21C, normally four of them. The chains clear out the inner wall of the scrubber 20, at a spacing of about 0.25"-0.5". The chains are relatively loose lengthwise to give them more flexibility in knocking down the scrubbing products that are continuously being deposited onto the scrubber walls. The chains extend lengthwise from near the top of the scrubber 20 to near the bottom, fully covering the spraying area.

The solid precipitates which are being collected at the bottom 75 of the scrubber are removed continuously or intermittently through conduit 130, pump 140, and conduit 108. A gate valve 75B, at the bottom of the scrubber 20, which is normally open during the operation, can be closed off to isolate the scrubber 20 from its bottom part 75 where the precipitates are being collected.

The solid precipitates are normally in the form of a sludge when removed from the scrubber, with water content ranging from 20 to 60%. Pump 140 can be one of a variety of different pumps that can handle slurry type materials and have chemically compatible wetted parts. Generally, a pump similar to pump 30 can be used for this purpose. The solid precipitates according to the present invention will be passed to holding tank 109 by conduit 108 for recycling back to the thermal process, thus no additional solid or liquid wastes are formed in this operation.

In the figure, the scrubbed exhaust gases from the solid recovery scrubber 20 are directed into the secondary scrubber 80 through conduit 50. The off-gas exhaust is further scrubbed by a reagent solution sprayed downward from spray nozzles 106. Spray nozzles 106 produce a high velocity solution curtain across the top cross section of the scrubber 80 which effectively removes the majority of the leftover contaminants from the exhaust gases emitting from scrubber 20.

The scrubber solution 80A collected in the bottom 80B of scrubber 80 is then recycled back to the sprayers through return line 100, pump 85, heat exchanger 90 and line 105. The amount of accumulated solids in the secondary scrubber solution is much smaller as compared to the solid recovery scrubber 20 due to the reasons mentioned above. Nevertheless, pump 85 can be similar to pump 30 so pump 85 can handle slurry type liquids. Heat exchanger 90 can be similar in construction to the heat exchanger 35.

After a long period (days or weeks depending on the specific application) of operation, scrubber 80 is expected to have some solid accumulation at the bottom part 80B of the secondary scrubber 80. The solids will be removed by a similar mechanism as described for the solid recovery scrubber 20.

To remove the solids, gate valve 110 is closed which isolates all or a majority of the bottom solid residue in bottom 80B from the scrubber 80, which is then transferred into a holding tank 126, through pipe lines 115 and 125 by slurry pump 121. Slurry pump 121 is of a similar type as pump 140 which is used for the solid recovery scrubber 20. The slurry in the holding tank 126 is then added to the feed for thermal processing unit 4.

Reagents are added from reagent reservoirs 65 to the scrubbers 20 and 80 through metering pumps 70 and 71. Normally, samples of scrubber solution are taken as often as possible. The samples can be quickly analyzed for basicity and other scrubbing products. The information obtained is fed back to the operators who in turn add appropriate amounts of the reagents to the scrubbers. As was mentioned previously, optionally, concentrated reagent can be added through metering pump 71 only to the secondary scrubber 80, which then will flow out into the solid recovery scrubber 20 through line 60.

The scrubbed exhaust from the secondary scrubber 80 then enters conduit 120 to a mist eliminator 131. The mist eliminator can be of a variety of standard equipment available in the industry. The exhaust air entering mist eliminator 131 is normally below its dew point, and would produce condensate when brought into contact with a large surface area associated with the mist eliminator. The condensate is returned back to the secondary scrubber 80 through conduit 132.

A booster blower 145 connected to mist eliminator 131 by conduit 135 would compensate for all pressure drops in the scrubbers, conduits and the mist eliminator. The booster blower is equipped with a damper, so that the pressure drops in the scrubbers are maintained at optimum operational efficiencies.

In order to release cleaned exhaust to the atmosphere, the off-gas must be filtered through a HEPA filter to remove all the airborne particulate. However, to eliminate the possibility of condensation inside the HEPA filter which would render it ineffective, the inlet air must be heated above its dew point. Heater 146 is used to preheat the incoming air passing through conduit 150 to the prefilter/HEPA assembly 155. The filter assembly 155 is equipped with a baghouse. The solid particulate recovered from the baghouse is recycled back into the thermal processing unit by conduit 156. Therefore, no secondary solid waste is generated. The clean air is exhausted through conduit 160 to the atmosphere.

In one example, the main function of the solid recovery scrubber is to reclaim solid concentrated fluorides which among others contains sodium, uranium, thorium, and silicon fluorides. The main constituent of the solid phase is sodium fluoride which is formed by reaction of gaseous hydrofluoric acid in the melter exhaust stream and the liquid sodium hydroxide which is sprayed onto the exhaust gases in the scrubber resulting in the formation of sodium fluoride. Other gaseous fluorides in the exhaust would also segregate as sodium hydrated salts in the scrubber solution.

The exhausted gas from the solid recovery scrubber is therefore primarily composed of air, water vapor, and very low levels of fluoride. When the concentration of sodium fluoride in the scrubber exceeds the solubility limit of about 1 molar, precipitation occurs, and the solid phase is collected at the bottom of the scrubber. The solid sodium fluoride is then removed from the scrubber and is recycled back into the melter feed.

The liquid scrubber chemistry is similar to the solid recovery scrubber but the concentration of sodium fluoride is kept always below the saturation limit of 1 molar and thus no solid phase is formed in the scrubber. The liquid scrubber has several additional functions. It is a back up recovery system for the solid recovery scrubber in case any gaseous or aerosol fluoride escapes the solid scrubber. It condenses incoming water vapor from the solid scrubber. It also provides a continuous supply of sodium hydroxide to the scrubber through an open line between the two. Fresh sodium hydroxide is added when needed to the liquid scrubber which in turn migrates or is pumped by pump 55 through a conduit 60 to the solid scrubber. To avoid formation of low level waste from the scrubber operation, the total solution volume in both scrubbers is kept constant by controlling the rate of water condensation from the liquid scrubber. The rate of water condensation is controlled by adjusting the temperature of the liquid scrubber.

Having described the invention, many modifications thereto will become apparent to those skilled in the art to which it pertains without deviation from the spirit of the invention as defined by the scope of the appended claims.

We claim:

1. A process for cleaning exhaust off-gas from a thermal processing unit containing contaminants which cannot be released to the environment, said process comprising:

passing exhaust off-gas through an initial wet exhaust off-gas scrubber unit having a first basic solution containing at least one base reagent and water, contacting the exhaust off-gas with a spray of said solution to cool the exhaust off-gas by partial evaporation, reacting at least one contaminant from the exhaust off-gas with the base reagent in a liquid stream, said partial evaporation and reaction resulting in concentration and precipitation of said at least one contaminant from the exhaust off-gas, further introducing the exhaust off-gas to at least one secondary scrubbing unit having a second basic solution containing said at least one base reagent and water resulting in further removal of contaminants from the exhaust off-gas and replenishing the first basic solution in the initial scrubber unit by transferring of said second basic solution from the at least one secondary unit to the initial scrubber unit, and removing solid precipitate from the initial exhaust off-gas scrubber unit in the form of a wet sludge.

2. A process for cleaning exhaust off-gas from a thermal processing unit containing contaminants which cannot be released to the environment, said process comprising:

cooling exhaust off-gas in a first unit of at least two wet flue gas scrubbing units in series by contacting the exhaust off-gas with a spray of a basic solution containing at least one basic reagent containing water to cool the exhaust off-gas by partial evaporation resulting in concentration and precipitation of a majority of at least one of the contaminants from the exhaust off-gas by reacting said at least one of the contaminants from the exhaust off-gas with the at least one basic reagent in a liquid stream, further removing contaminants from the exhaust off-gas in subsequent scrubbing units of the at least two scrubbing units, and connecting an area of the first unit with the subsequent scrubbing units so that any volume losses of the first unit which may occur in the first unit can be replenished by transfer of any volume gains of the subsequent scrubbing units which may occur in the subsequent scrubbing units, removing solid precipitate from the first unit in the form of a wet sludge.

3. A process for cleaning exhaust off-gas from a thermal processing unit containing contaminants which cannot be released to the environment, said process comprising:

cooling the exhaust off-gas by partial evaporation with a spray of a first basic solution containing at least one base reagent and water contacting the exhaust off-gas, reacting contaminants from the exhaust off-gas with the at least one base reagent in a liquid stream, said partial evaporation resulting in concentration and reaction of said contaminants as solids from the exhaust off-gas, further cooling the exhaust off-gas resulting in condensation of the water evaporated by the initial cooling, connecting an area of the initial cooling and an area of the further cooling for transfer of a weaker concentration of a second basic solution containing a base from the area of the further cooling to the area of the initial cooling to add to the higher concentration of the first basic solution, and removing solid precipitate from the area of initial cooling in the form of a wet sludge.

4. The process as claimed in claim 3, wherein the solid contaminants are recycled to the thermal processing unit to decrease production of a waste stream by the thermal processing unit.

5. The process as claimed in claim 4, wherein the solid contaminants contain fluoride.

6. The process as claimed in claim 4, wherein the solid contaminants are radioactive.

7. The process as claimed in claim 3, wherein the area of the initial cooling of the exhaust off-gas is scraped to remove solid contaminants.

8. A process for cleaning exhaust off-gas from a thermal processing unit, said process comprising:

spraying and contacting the exhaust off-gas with a first basic solution to cool the exhaust off-gas by partial evaporation of the first basic solution and to form a solid precipitate, subsequently spraying the exhaust off-gas with a second basic solution to further cool the exhaust off-gas, mixing a portion of the second basic solution with the first basic solution after a predetermined period of time to maintain a constant level of the solutions, and removing said solid precipitate in the form of a wet sludge.

9. The process as claimed in claim 8, wherein the first basic solution includes at least one reagent containing water.

10. The process as claimed in claim 8, wherein contaminants which cannot be released to the environment are removed from the exhaust off-gas by the first basic solution.

11. The process as claimed in claim 8, wherein the first basic solution includes sodium hydroxide.

12. The process as claimed in claim 10, wherein the solid contaminants are collected and recycled to the thermal processing unit.

13. An off-gas scrubber system for containing contaminants which cannot be released to the environment, said off-gas scrubber system comprising:

a thermal processing unit, a wet flue gas, solid recovery scrubber connected to said thermal processing unit for treating exhaust off-gas from said thermal processing unit, first spray means for spraying a first basic solution on exhaust off-gas in said solid recovery scrubber to react at least one contaminant from the exhaust Off-gas with the first basic solution in a liquid stream, collection means located at the bottom of said solid recovery scrubber for collecting wet sludge including said solid contaminants produced by partial evaporation of said first basic solution in said scrubber, a secondary scrubber located downstream from said solid recovery scrubber and connected to said solid recovery scrubber for receipt of exhaust off-gas from said solid recovery scrubber, second spray means for spraying a second basic solution on exhaust off-gas in said secondary scrubber, connection means for transferring a portion of said second basic solution from said secondary scrubber to said solid recovery scrubber upon loss of a predetermined portion of said first basic solution from said solid recovery scrubber by partial evaporation of said first basic solution, and removal means for removing said wet sludge from said wet flue gas, solid recovery scrubber.

14. An off-gas scrubber system as claimed in claim 13, wherein said solid recovery scrubber includes scraper means for scraping walls of said solid recovery scrubber.

15. An off-gas scrubber system as claimed in claim 13, wherein an air flow controller controls temperature of exhaust off-gas passing from said thermal processing unit to said solid recovery scrubber.

16. An off-gas scrubber system as claimed in claim 13, wherein said first basic solution is recycled in said solid recovery scrubber.

17. An off-gas scrubber system as claimed in claim 13, wherein said second basic solution is recycled in said secondary scrubber.

18. An off-gas scrubber system as claimed in claim 13, wherein the thermal processing unit is a glass melter.

19. An off-gas scrubber system as claimed in claim 18, wherein the glass melter vitrifies hazardous material.

20. An off-gas scrubber system as claimed in claim 19, wherein the hazardous material is asbestos.

21. An off-gas scrubber system as claimed in claim 19, wherein the hazardous material is medical waste.

22. An off-gas scrubber system as claimed in claim 19, wherein the hazardous material is radioactive waste.

23. A process for cleaning exhaust off-gas from a thermal processing unit containing contaminants which cannot be released to the environment, said process comprising:
   passing the exhaust off-gas through an initial wet flue gas scrubber unit having a first basic solution containing at least one base reagent and water,
   contacting the exhaust off-gas with a spray of said solution to cool the exhaust off-gas by partial evaporation,
   reacting at least one contaminant from the exhaust off-gas with the base reagent in a liquid stream,
   said partial evaporation and reaction resulting in concentration and precipitation of said at least one contaminant from the exhaust off-gas,
   further introducing the exhaust off-gas to at least one secondary scrubbing unit having a second basic solution containing said at least one base reagent and water with said at least one base reagent in said at least one secondary scrubbing unit being weaker in strength than said at least one base reagent in said initial scrubbing unit resulting in further removal of contaminants from the exhaust off-gas and replenishing the first basic solution in the initial scrubber unit by transferring of said second basic solution from the at least one secondary scrubber unit to the initial scrubber unit, and
   removing solid precipitate from the initial exhaust off-gas scrubber unit in the form of a wet sludge.

24. A process for cleaning exhaust off-gas from a thermal processing unit containing solid contaminants which cannot be released to the environment, said process comprising:
   passing the exhaust off-gas through an initial wet flue gas scrubber unit having a first basic solution containing at least one base reagent and water,
   contacting the exhaust off-gas with a spray of said solution to cool the exhaust off-gas by partial evaporation,
   reacting at least one contaminant from the exhaust off-gas with the base reagent in a liquid stream,
   said partial evaporation and reaction resulting in concentration and precipitation of said at least one contaminant from the exhaust off-gas,
   further introducing the exhaust off-gas to at least one secondary scrubbing unit having a second solution containing water resulting in further removal of contaminants from the exhaust off-gas and adding to the first basic solution in the initial scrubber unit by transferring of said second solution from the at least one secondary unit to the initial scrubber unit,
   removing heat from the second solution during recycling of the second solution in the at least one secondary scrubbing unit to maintain on average a fixed total volume of the solution in the scrubbing units, and
   removing solid precipitate from the initial exhaust off-gas scrubber unit in the form of a wet sludge.

25. A process for cleaning exhaust off-gas from a thermal processing unit, said process comprising:
   cooling the exhaust off-gas by partial evaporation by contact with a first basic solution containing at least one base reagent and water, said partial evaporation resulting in concentration and precipitation of contaminants from the exhaust off-gas,
   further cooling the exhaust off-gas resulting in condensation of the water evaporated by the initial cooling, and
   knocking down solid scrubbing products deposited in slurry form on the walls of the initial cooling area.

26. The process of claim 1, wherein a concentration of said first basic solution and said second basic solution is adjusted by adding said base reagent to at least one of said initial scrubber and said at least one secondary scrubbing unit.

27. A process for cleaning exhaust off-gas from a thermal processing unit according to claim 25, wherein the knocking down of solid scrubbing products is done by scraping.

* * * * *